(12) United States Patent
Kamen et al.

(10) Patent No.: US 9,081,476 B2
(45) Date of Patent: Jul. 14, 2015

(54) ELECTRONIC PROGRAMMING GUIDE

(75) Inventors: Yakov Kamen, Cupertino, CA (US);
Leon Shirman, Redwood City, CA (US)

(73) Assignee: JLB VENTURES LLC, Washington, DC (US)

( * ) Notice: Subject to any disclaimer, the term of this patent is extended or adjusted under 35 U.S.C. 154(b) by 1150 days.

(21) Appl. No.: 12/368,570

(22) Filed: Feb. 10, 2009

(65) Prior Publication Data
US 2009/0150934 A1    Jun. 11, 2009

Related U.S. Application Data

(63) Continuation of application No. 10/156,167, filed on May 28, 2002, now Pat. No. 7,503,003, which is a continuation of application No. 09/488,361, filed on Jan. 16, 2000, now Pat. No. 6,421,067.

(51) Int. Cl.
| H04N 7/10 | (2006.01) |
| H04N 7/025 | (2006.01) |
| G06F 3/00 | (2006.01) |
| G06F 13/00 | (2006.01) |
| H04N 5/445 | (2011.01) |

(Continued)

(52) U.S. Cl.
CPC ........ *G06F 3/04815* (2013.01); *H04N 5/44543* (2013.01); *H04N 21/4312* (2013.01); *H04N 21/4316* (2013.01); *H04N 21/4622* (2013.01); *H04N 21/478* (2013.01); *H04N 21/482* (2013.01); *H04N 5/4401* (2013.01); *H04N 9/641* (2013.01)

(58) Field of Classification Search
USPC .............. 725/37–61; 715/757, 782, 836, 848, 715/850, 852
See application file for complete search history.

(56) References Cited

U.S. PATENT DOCUMENTS

| 4,621,259 A | 11/1986 | Schepers et al. |
| 5,369,735 A * | 11/1994 | Thier et al. .................... 345/423 |

(Continued)

FOREIGN PATENT DOCUMENTS

| EP | 1 024 661 | 8/2000 |
| WO | 98/06219 | 2/1998 |

(Continued)

OTHER PUBLICATIONS

Search Report received for corresponding European application No. 10 18 1438 dated Feb. 10, 2011.

*Primary Examiner* — Nasser Goodarzi
*Assistant Examiner* — Kyu Chae
(74) *Attorney, Agent, or Firm* — Banner & Witcoff, Ltd.

(57) ABSTRACT

An electronic programming guide ("EPG") provides pictograms and/or logos, to indicate to a television viewer the programs being displayed on a television. The EPG information display format is thus easier to recognize than prior EPG formats. The EPG pictograms may have 3D characteristics. The EPG information can be displayed in a window within a television screen while a program is being shown on the remainder of the screen. The EPG comprises a set of geometric surfaces located in virtual 3D space. The pictograms and/or logos, along with alpha-numeric text data and video clips are applied to the geometric surfaces using a 3D graphics pipeline. The appearance of the pictograms, logos, alpha-numeric data and/or video clips can be modified in response to a user actuating a control element on a remote controller. In one embodiment, internet HTML pages are parsed and applied to geometric surfaces in 3D virtual space.

16 Claims, 7 Drawing Sheets

(51) Int. Cl.
  *G06F 3/048* (2013.01)
  *G06F 3/0481* (2013.01)
  *H04N 21/462* (2011.01)
  *H04N 21/431* (2011.01)
  *H04N 21/478* (2011.01)
  *H04N 21/482* (2011.01)
  *H04N 5/44* (2011.01)
  *H04N 9/64* (2006.01)

(56) References Cited

U.S. PATENT DOCUMENTS

| | | | |
|---|---|---|---|
| 5,485,197 A | 1/1996 | Hoarty | |
| 5,526,034 A | 6/1996 | Hoarty et al. | |
| 5,550,576 A | 8/1996 | Klosterman | |
| 5,550,578 A | 8/1996 | Hoarty et al. | |
| 5,550,960 A | 8/1996 | Shirman et al. | |
| 5,579,057 A | 11/1996 | Banker et al. | |
| 5,678,012 A | 10/1997 | Kimmich et al. | |
| 5,684,525 A | 11/1997 | Klosterman | |
| 5,724,492 A * | 3/1998 | Matthews et al. | 345/419 |
| 5,758,259 A | 5/1998 | Lawler | |
| 5,781,246 A | 7/1998 | Alten et al. | |
| 5,809,204 A | 9/1998 | Young et al. | |
| 5,822,123 A | 10/1998 | Davis et al. | |
| 5,828,945 A | 10/1998 | Klosterman | |
| 5,850,218 A | 12/1998 | LaJoie et al. | |
| 5,889,950 A | 3/1999 | Kuzma | |
| 5,923,362 A | 7/1999 | Klosterman | |
| 5,940,073 A | 8/1999 | Klosterman et al. | |
| 5,963,215 A * | 10/1999 | Rosenzweig | 345/649 |
| 5,982,445 A | 11/1999 | Eyer et al. | |
| 6,034,678 A | 3/2000 | Hoarty et al. | |
| 6,072,983 A | 6/2000 | Klosterman | |
| 6,078,348 A | 6/2000 | Klosterman et al. | |
| 6,094,237 A * | 7/2000 | Hashimoto | 348/731 |
| 6,100,883 A | 8/2000 | Hoarty | |
| 6,111,614 A | 8/2000 | Mugura et al. | |
| 6,154,203 A | 11/2000 | Yuen et al. | |
| 6,205,485 B1 | 3/2001 | Kikinis | |
| 6,205,582 B1 | 3/2001 | Hoarty | |
| 6,317,881 B1 * | 11/2001 | Shah-Nazaroff et al. | 725/24 |
| 6,331,852 B1 * | 12/2001 | Gould et al. | 345/419 |
| 6,388,715 B1 | 5/2002 | Eggen et al. | |
| 6,556,197 B1 | 4/2003 | Van Hook et al. | |
| 6,577,350 B1 * | 6/2003 | Proehl et al. | 348/564 |
| 6,608,633 B1 * | 8/2003 | Sciammarella et al. | 715/700 |
| 6,667,741 B1 | 12/2003 | Kataoka et al. | |
| 6,674,484 B1 | 1/2004 | Boland et al. | |
| 6,754,906 B1 * | 6/2004 | Finseth et al. | 725/45 |
| 7,047,550 B1 * | 5/2006 | Yasukawa et al. | 725/44 |
| 7,503,003 B2 * | 3/2009 | Kamen et al. | 715/719 |
| 2001/0012020 A1 * | 8/2001 | Stautner et al. | 345/721 |
| 2004/0221307 A1 * | 11/2004 | Arai et al. | 725/44 |

FOREIGN PATENT DOCUMENTS

| | | |
|---|---|---|
| WO | 98/21877 | 5/1998 |
| WO | 99/23831 | 5/1999 |

* cited by examiner

ELECTRONIC PROGRAMMING GUIDE

CROSS-REFERENCE TO RELATED APPLICATIONS

This application is a continuation of pending U.S. application Ser. No. 10/156,167, filed May 28, 2002, which is a continuation of U.S. Pat. No. 6,421,067, filed Jan. 16, 2000, all of which are incorporated herein by reference.

BACKGROUND OF THE INVENTION

The present invention pertains to electronic programming guides ("EPGs").

Presently existing EPGs provide television viewers with on-screen television schedule information, e.g. in a convenient regular or non-regular rectangular grid format. One type of EPG is used in conjunction with an analog television system. In such a system, one of the cable channels is reserved for displaying programming information. The programming information is displayed in a grid, e.g. grid 2 of FIG. 1. Grid 2 comprises four columns 3-6. First column 3 lists the various channels of the cable broadcast system. Columns 4, 5 and 6 indicate what is showing on the channels listed in column 3 in half-hour increments. Thus, if one tunes to the EPG at 10:35 p.m., second column 4 displays what is showing between 10:00 and 10:30 p.m., third column 5 displays what is showing between 10:30 and 11:00 p.m., and fourth column 6 displays what is showing between 11:00 p.m. and 11:30 p.m. A row 7 at mid-screen indicates what time slots columns 4 to 6 correspond to. (A portion 8 of screen 9 above row 7 usually provides continuous advertisements.)

In most cable TV systems, there are more television channels than there is space for rows in grid 2. Accordingly, grid 2 typically scrolls at a pre-selected slow rate, so that a viewer can see what is showing on all of the channels.

The information contained in an analog EPG is typically broadcast by a cable operator on a dedicated one of the channels of the cable TV system.

Most digital EPGs operate in a different way. In a digital EPG, program schedule information, and sometimes applications and/or systems software, is transmitted to equipment located on the viewer's premises (usually a "digital set-top box" or STB) by way of broadcast, cable, direct satellite or some other suitable form of transmission. The STB contains memory (and is in essence a dedicated computing device) so that the program schedule information can be stored for later viewing. The program schedule information stored in the STB is periodically updated (e.g., on a continuous, daily, weekly, or biweekly basis). A microprocessor within the STB cooperates with the viewer's television set to display the stored program schedule information and to implement other functions of the EPG in response to user-generated signals. The functions available depend on the sophistication of the particular EPG.

Digital EPGs are often used in an interactive television system. In an interactive television system EPG, a user may browse schedule information in any order, select programs from on-screen menus for current or future viewing and order pay-per-view programming on demand. Some EPGs permit other functions, e.g. an e-mail function, or a function that permits a user to block certain kinds of programs such as adult or violent programs.

Collectively, prior EPGs fail to provide viewing capabilities that realistically address the viewing habits of the users of these systems. As mentioned above, an analog TV EPG is viewed on a TV screen as a permanently scrolling rectangular table. This solution does not require from users any additional interaction and is suitable for a completely passive television viewer (the so-called "couch potato"). Unfortunately, this is a poor solution for interactive TV, because:

The scrolling speed is constant and cannot be adjusted.

In an analog EPG system, the user cannot switch to the channel of choice immediately from the EPG (e.g. by clicking on a display of a channel number on the EPG). Instead, the user must input the channel number with a remote controller.

The analog EPG scrolling table is completely sequential (providing information in an order depending upon channel number) and the user cannot pre-sort schedule data or otherwise personalize the EPG.

A two-way interactive EPG is more sophisticated. Unfortunately this solution also has many problems. Interactive EPG systems provide drop-down menus that require multiple steps in order to interact with the EPG, which is very frustrating when a search for a desired program is unsuccessful. The EPG is inflexible in terms of menu design, because the menu itself is a set of regular two-dimensional grids.

Some of the other problems with prior art EPGs are as follows.

Program Description Truncation. When displaying schedule information in grid format, i.e., columns representing time slots and rows representing channels, program titles are generally truncated to fit into the cells of the grid. The width of a grid cell varies with the program duration. Since a 30 minute program is allotted only a small space for the program title and description, titles and/or descriptions for half and even full hour programs often must be truncated to fit in the allotted space. Some systems simply cut off the description of a program without abbreviating it in any way, such that the user cannot determine the subject matter of the program. Although some systems partially alleviate this problem by providing two lines of text in each grid cell, this solution is not ideal because program descriptions may still be truncated.

Inability to Simultaneously Channel Surf and View EPG. Prior EPGs lack a method for creating a viewing itinerary electronically while a user concurrently views a program on the television screen. In other words, when a user views a program on a particular channel, he or she cannot electronically set up a sequence of other channels to surf. Moreover, these prior EPGs leave much guess work for the user as he or she navigates through a sequence of channels. When skimming through channels and trying to determine what program is being displayed on a channel, commonly known as "channel surfing," the user must guess which program is currently being aired from the video segment encountered during channel surfing. Since much—in some cases, up to 30%—of the programming appearing on a channel at any given time is advertising, the user is not provided with any clues as to what program is appearing on a selected channel at a given time. Therefore, the user must wait until the advertisement or commercial ends before learning which program is appearing on the selected channel. Thus, a need exists for an EPG that displays current program schedule information for each channel at the same time that the user surfs through the channels.

Text Size. Unfortunately, current EPGs allow for only one font size. However, human beings do not all have the same acuity of vision. Therefore, some viewers may be unable to read the information in the EPG.

Specular Highlighting. Existing EPGs provide only a very rudimentary lighting capability. In other words, existing EPGs do not have a very sophisticated ability to adjust the brightness of the EPG. This detracts from the utility of the EPG.

SUMMARY

An EPG in accordance with one embodiment of the invention comprises a set of pictograms containing information identifying programs being shown on a set of video channels. The pictograms comprise non-alphanumeric symbols to assist a viewer in determining what is being shown, even if the various options displayed in the EPG are too small for normal alphanumeric characters to be used. In one embodiment, the pictograms contain one or more colors that assist the viewer in recognizing the pictogram and thereby determining what programs are being shown. In one embodiment, the EPG includes both pictograms and text (alphanumeric symbols) to indicate what programs are being shown.

In one embodiment, the EPG is shown in a window region within a television screen while the other portion of the screen displays a television program. Thus, a viewer can view a program broadcast on a television channel and the EPG simultaneously. The viewer can determine what program is on the channel he is watching, even if the viewer turns to that channel while a commercial is being shown. Further, the viewer can identify other programs and select them by clicking on various icons or pictograms in the EPG. Thus, the viewer can easily select channels showing other desirable programs while the television is tuned to another program.

As mentioned above, the EPG uses pictograms. These pictograms can be distinctive in shape and color. Thus, even if the EPG is "shrunk" to fit in a relatively small window within the TV viewing screen, a viewer can still determine from the EPG which programs are of interest, and which programs are not of interest.

In one embodiment, the EPG permits a user to "zoom" in on, or otherwise visually expand portions of, the EPG program listing. Thus, the viewer can identify those parts of the EPG showing programs of interest.

In one embodiment, the EPG and EPG pictograms are generated using a 3D graphics pipeline. The EPG comprises a set of textured geometric surfaces that form the pictograms as well as alphanumeric text data. (The geometric surfaces textured to form pictograms and alphanumeric data are called "data surfaces".) The EPG also comprises a set of "video surfaces," i.e. geometric surfaces textured with video images from television programs, previews of television programs, or video data stored in a memory such as a hard disk drive. The geometric surfaces, including both data surfaces and video surfaces, can be arbitrarily positioned in virtual 3D space to provide data and video information. For example, the video surfaces can be positioned in one part of a television screen and the data surfaces can be positioned in another part.

In one embodiment, display of the EPG surfaces can be modified in response to certain events, e.g. a remote controller button being pushed. For example, when a control button on a remote controller is actuated to select one of the pictograms, the EPG can highlight the selected pictogram, or alter a video surface showing a program preview. This alteration of the video surface can be in the form of zooming in on the video surface by changing its position in virtual 3D space or changing the color of the video surface by changing specular, ambient, and directional lighting. In one embodiment, the EPG can alter a data surface by changing the texture applied to that surface, changing the lighting applied to that surface, or moving the surface in virtual 3D space. By altering the various video and data surfaces, the surfaces (including pictograms) can be observed from different perspectives, (i.e. from different "virtual locations"). This facilitates a viewer zooming in on the various pictograms to better identify what kind of program they represent.

In one embodiment, the EPG includes icons or pictograms related to other items of interest, e.g. icons or pictograms that can be clicked on for pay-per-view events. Thus, a viewer can click on a pictogram to watch a pay-per-view boxing match, movie, concert, or other event.

In another embodiment, icons or pictograms are included in the EPG corresponding to different types of merchandise or services. A user can click on these pictograms to obtain information concerning these goods and services, and order them using the EPG.

In one embodiment, the EPG provides user assistance. This user assistance can be in the form of prompts that are displayed if the viewer presses an inappropriate control button. In another embodiment, the EPG indicates to the viewer what controls are appropriate to actuate in a given situation.

In one embodiment, the font size (and the pictogram size) of the EPG image can be adjusted by the user, as can the lighting and colors of the EPG display.

These and other features of the invention are described in greater detail below.

BRIEF DESCRIPTION OF THE DRAWINGS

FIG. 2C' illustrates an EPG using faces of a polyhedron to show thumbnail displays of different programs.

FIG. 5 also shows the manner in which an EPG in accordance with the present invention can be viewed concurrently with a television program.

DETAILED DESCRIPTION

This invention relates to an EPG system that provides a user with schedule information for broadcast programs (including cablecast, or datacast programs) viewed by the user on a television or a PCTV. (A PCTV is a personal computer having the capability of displaying video programs.) This invention also relates to an improved EPG that uses a 3D graphics pipeline to display images, alphanumeric text and video data and provides the user with a more powerful and convenient television in a desktop environment, while simultaneously increasing the efficiency of navigation by the user through the EPG.

Figure 1:
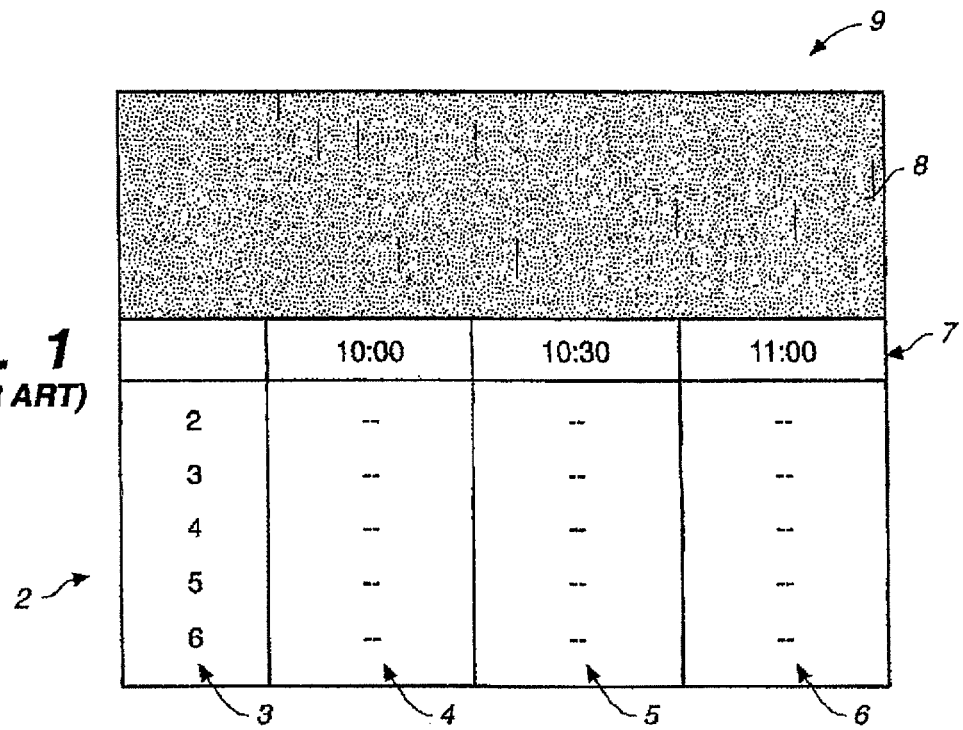
FIG. 1 illustrates an EPG display in accordance with the prior art.
Figure 2A:
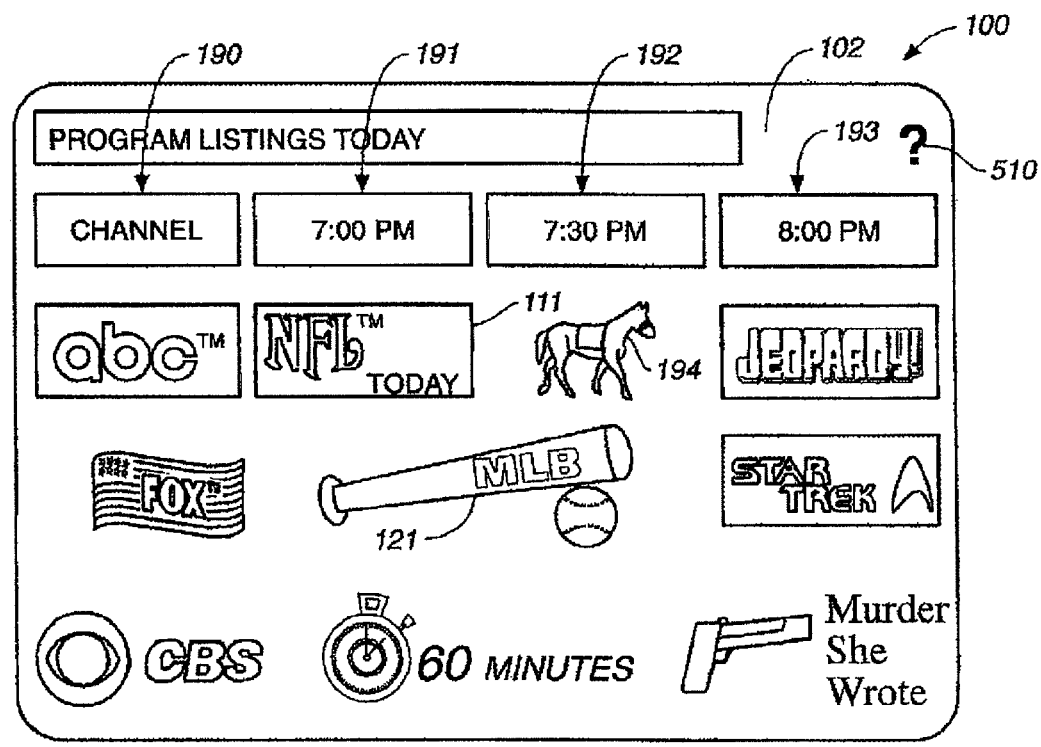
FIG. 2A illustrates an EPG display including a set of columns indicating what is being shown on television during various time periods.
Figure 2:
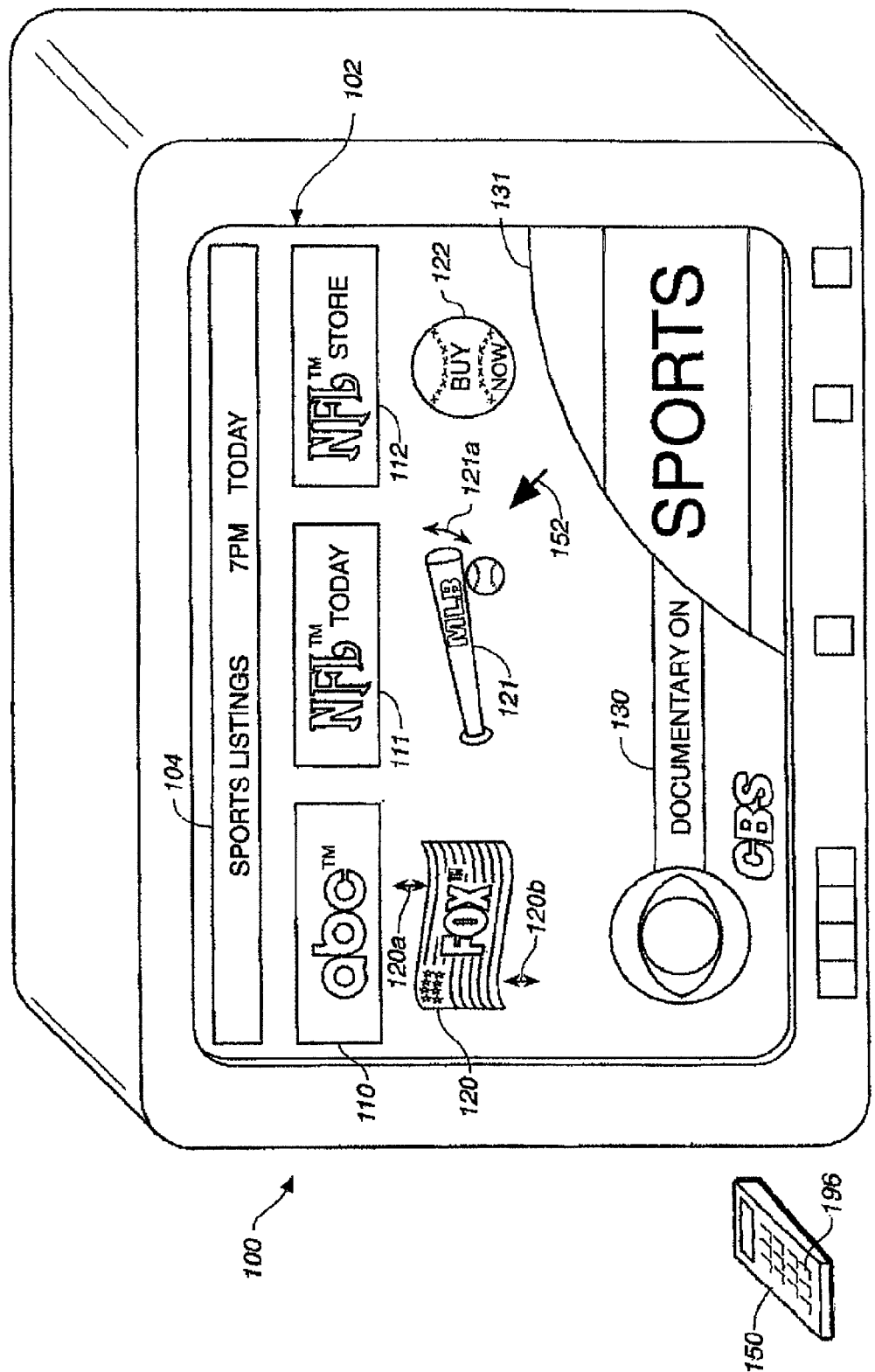
FIG. 2 illustrates an EPG display in accordance with the present invention.

FIG. 2 shows a television system 100 comprising a video screen 102 in accordance with the invention. Screen 102 is shown in a slight isometric aspect to allow some of the banners such as 110, 111, 120 etc. to be visibly skewed, as in 3D space. In many cases, the normal view would actually be perpendicular to the viewer's line of sight. An EPG in accordance with the invention can be put in any of several modes. In one mode, the EPG is programmed to list television programs of a particular type, e.g. sports programs, movies, children's programs, sitcoms, etc. In the example displayed in FIG. 2, the EPG lists sports programs. In another mode (not shown), the EPG lists movies that are currently being shown on television. In another mode, the LPG lists all programs, regardless of the type of program, in the order of the television station number.

In another mode, the EPG lists programs alphabetically. A user can select the EPG mode by actuating appropriate control buttons on a remote control device 150. In FIG. 2, a rectangular title bar 104 indicates the type of programs listed by the EPG. In particular, title bar 104 indicates that the programs listed by the EPG are sports programs. The selected listings, as an example only, include three columns, the first of which identifies the various television stations (110, 120, etc.), the second column identifies the program (111, 121, etc.) and the third column identifies special activities such as merchandising (112, 122, etc.).

Rather than displaying a matrix of rectangular boxes containing text as shown in FIG. 2, 3D objects with real shapes can be displayed on screen 102 along with rectangular or bar shaped text blocks. For example, display element 110 shows "ABC™" in a rectangular block, while display element 120 shows Fox as a waving flag, symbolically indicated by arrows 120a and 120b. One example of a method for displaying such an image using 3D accelerator technology is discussed below.

Display element 121 is a baseball and bat, thereby indicating that the show in question is a baseball game. Again, motion of the bat is symbolically indicated by arrow 121a. Display element 111 is a text block, indicating that a program being shown is a football game. It is thus seen that the LPG can use both pictograms and text blocks to indicate what program is being shown. However, in other embodiments, only pictograms are used. The pictograms and/or text blocks can be displayed using colors that help identify what program is being shown.

The EPG is typically used in conjunction with a remote control device, e.g. remote control device 150. Remote control device 150 can communicate with television system 100 in any of a number of ways, e.g. infrared signals, radio signals, or a cable connection. In one embodiment, the remote control device contains a mechanism by which the user can manipulate a cursor, e.g. cursor 152 on screen 102. Remote control device 150 can comprise a joystick, track ball, touch pad, mouse, a set of up/down left/right buttons, lever, or other type of control mechanism. The user can move cursor 152 to image 110 to select and watch the program playing on the channel corresponding to image 110 (in this example, ABC). Alternatively, the user can move cursor 152 to image 120 to watch the program playing on the channel corresponding to image 120. Alternatively, the viewer can click on image 111 to watch the program corresponding to image 111 (in this case, an NFL football game).

As mentioned above, remote controller 150 can use any of a number of transmission techniques to communicate with television system 100. In addition, remote controller 150 can be a dedicated for use with television system 100 (e.g. incorporating a single command set for use with system 100), or remote controller 150 can be designed for use in conjunction with different types of devices in addition to television system 100. In addition, remote controller 150 can be programmable so that it can implement different types of command sets. (An example of a remote controller having such programmable capabilities is discussed in U.S. Pat. No. 4,918,439, issued to Wozniak et al.)

Figure 3:
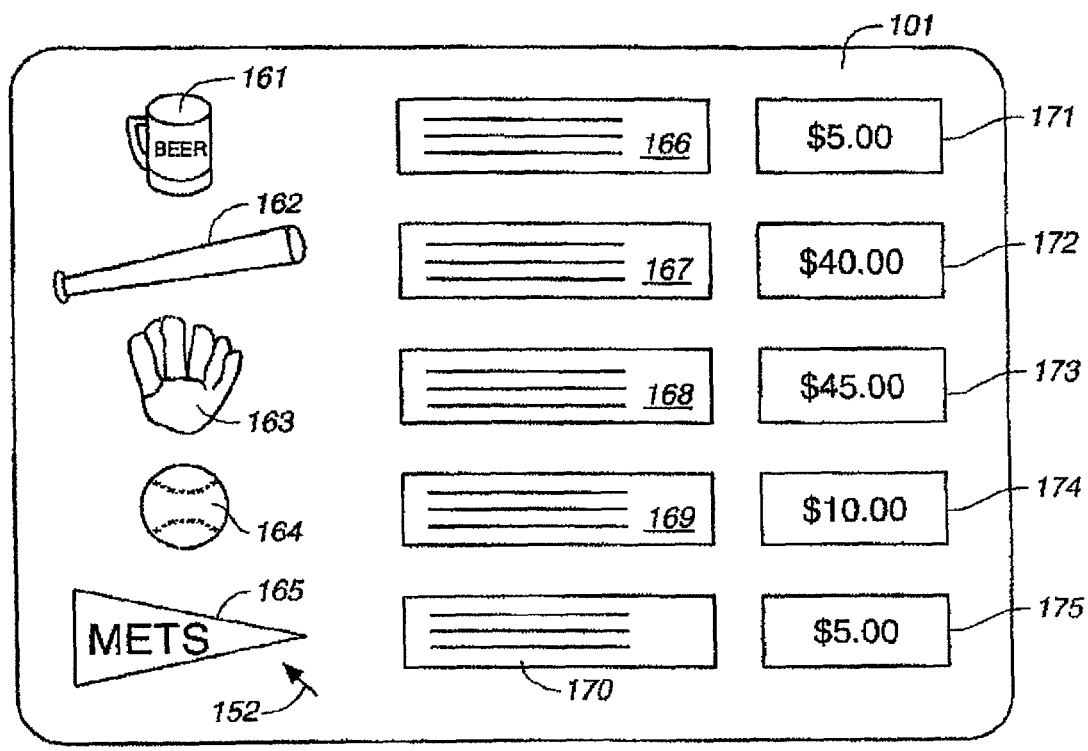
FIG. 3 illustrates a television screen displaying information concerning products that can be purchased using the EPG.

As mentioned above, the third column of images on screen 102 depicts icons or pictograms relating to merchandising. Screen 102 depicts logos or pictograms pertaining to merchandise that can be displayed and purchased using television system 100. For example, adjacent to logo 121 indicating that a baseball game is being shown on a particular station, a large baseball logo 122 appears, indicating that baseball-related products can be viewed and ordered by clicking on logo 122. A user can use cursor 152 to click on these logos to obtain information about the items being sold. For example, a user can click on baseball 122 to access information concerning merchandise that can be purchased using his or her interactive television system. When the user does this, information is downloaded from an information source and displayed on screen 102. This information pertains to products that can be purchased from a vendor. In one embodiment, this information is downloaded from a wide area network ("WAN") such as the Internet. Alternatively or concurrently, the information can be provided by the broadcaster that provides the television programs to television system 100. (This information can be provided on a dedicated channel. Alternatively, the information can be embedded in one of the blanking periods of the television signal, or embedded by any other suitable method compatible with the relevant analog and/or digital broadcast and encryption standards.) When the user clicks on baseball 122, information such as a web page is displayed on screen 102, listing various items that can be purchased, e.g. baseballs, bats, gloves, baseball cards, beer mugs, team banners, etc. For example, a page such as that shown in FIG. 3 can be displayed, illustrating the various items 161 to 165 that can be purchased, information in text blocks 166 to 170 concerning those items, and boxes 171 to 175 indicating the price of those objects. In one embodiment, the user can move cursor 152 to a picture of one of the items and click on that item to purchase it. (There are different control elements known for moving cursors including but not limited to such as mice, trackballs, gloves, keys, touchpads, joysticks etc. One or more of these control elements can be used to move cursor 152. As mentioned above, one or more of these control elements are typically incorporated in remote controller 150 for this purpose.) When a user clicks on one of items 161-165, a signal is communicated to the cable broadcast system, and the purchaser's order is processed. This can be accomplished using hardware similar to that discussed in U.S. patent application Ser. No. 09/449,016, filed by Kamen et al. on Nov. 24, 1999, and incorporated herein by reference.

Television networks or cable or satellite system operators may display logos or alternatively, a combination of indicative icons and corporate logos on EPG screen 102. For example, if a baseball game is played in 3Com Park in San Francisco, 3Com Corporation, for an additional fee, can have its logo inserted on screen 102 in lieu of or along with baseball and bat pictogram 121. Alternatively, in lieu of or along with baseball and bat pictogram 121, screen 102 may display logos of the teams playing. These logos can appear alone or placed on or adjacent to an image of a baseball to highlight the fact that the program in question is a baseball game. Numerous other combinations can also be displayed on screen 102.

Stations can use special logos or pictograms to be displayed by the EPG for their show categories, such as a magnifying glass for mysteries (or, alternatively a handgun), a smiling face for sitcoms, a guitar for music videos, etc. These logos or pictograms facilitate recognizing a show.

In some embodiments, the EPG grid can display text blocks and pictograms corresponding to some programs. Accordingly, screen 102 can get crowded. However, it will remain easy to recognize the shows by the shape and/or motion of the displayed pictograms, especially compared with the rectangular text blocks used in current EPGs. Further, if the pictograms on screen 102 use different colors (particularly unique colors), this further enhances readability of an EPG in accordance with the present invention compared with currently existing EPGs.

In one embodiment, the text blocks appearing in the EPG, if any, can also have unique colors and or fonts, which make it easier to recognize them as well.

In one embodiment, the user can program the EPG to modify the color and brightness of the different pictograms and text blocks, or to assign different color schemes to the pictograms or text blocks. Thus, a user might have all comedy-related pictograms or text blocks color-coded as bright blue, and all dramas are color coded as bright red. This further enhances the ability of the user to use the EPG to select desired programs with great ease. In particular, program types may be recognized, even if the text is too small to read. (The EPG typically receives information from the broadcaster indicating the types of programs being broadcast. The EPG can then display the program information in the appropriate color. This information can be received as part of the cable broadcast signal, or can be received from another source, e.g. a LAN or WAN.) The color of the various pictograms and text blocks can be modified by controlling the color of a "virtual lighting source" (described below) that is used to generate the image. Alternatively, the color of texture pixels used to generate the image can be modified. (As explained below, the various text blocks and pictograms are generated using a 3D graphics pipeline. This pipeline generates images by applying texture maps to one or more geometric surfaces, and applying a virtual light source to the textured surface or surfaces. The process by which this is done is described below.)

In one embodiment, the EPG pictograms and text blocks are scaled in the x and y directions to show expected run times. Alternatively, in another embodiment, the EPG pictograms and text blocks are scaled in the x and y directions to show their importance or rating on a scale, to which the viewer can subscribe. For example, in one embodiment, the user can subscribe to a movie rating service that rates the quality of movies. Information from the rating service can either be entered into the EPG system by the user, or by the cable system broadcaster. Exceptionally good films can be highlighted, e.g. by expanding the text block or pictogram associated with those films.

Similarly, the EPG can be programmed with information indicative of a user's tastes. Thus, if the system is programmed with information indicating that the user particularly enjoys sports programs, the EPG will highlight or expand those text blocks and pictograms corresponding to sporting events. Similarly, if the system has been programmed to indicate that the user prefers educational television, the EPG will highlight or expand those text blocks and pictograms corresponding to educational programs.

FIG. 2 illustrates an EPG display screen with three columns. In other embodiments, the EPG comprises more than three columns. For example, as shown in FIG. 2A, a first column 190 lists program channels, a second column 191 depicts programs currently playing, a column 192 depicts programs playing in the next half-hour, and a fourth column 193 depicts programs playing in the half hour after that. In FIG. 2A, baseball bat 121 spans columns 191 and 192, thereby indicating that the baseball game is expected to continue into the time slot corresponding to column 192. However, text block 111 does not extend through into column 192. This indicates that the football game is not expected to extend into the time slot corresponding to column 192. As can be seen, a pictogram 194 indicates that after the football game, ABC will be showing a horse race.

EPG Window Region

As mentioned above, frequently a viewer will want to channel surf while being able to determine what program he or she has just turned to. If a commercial is playing, the viewer has no way of knowing what program is on. In one embodiment, the viewer can press a control button on remote controller 150 that causes a window 103a to open on screen 102 FIG. 2B). The EPG is displayed within window 103a. Thus, a user can channel surf and watch programs on portion 103b of screen 102, while simultaneously seeing an identification of the program that he or she is currently watching. This is particularly useful if a commercial is playing. In addition, the user can see what is playing on other channels, and he or she can click on pictograms or text blocks corresponding to those other channels (or pictograms or text blocks corresponding to the programs being shown on those other channels) to change the channel of the television system. This represents a major improvement over prior art EPGs, which typically take up an entire television screen. Thus, these prior art EPGs do not permit a user to simultaneously watch one channel while investigating what is on other channels.

EPG Embodiment Displaying Magnified Segments

In one embodiment, it may be desirable to permit a user to magnify portions of the EPG so that the user can get a better view of what is being displayed. Accordingly, remote controller 150 contains a button 196 that permits the user to expand a selected portion of the EPG display. This is schematically shown by a bar 130 that extends into a region 131 of screen 102. As can be seen, the portion of bar 130 extending into region 131 is magnified, so the viewer can more easily see what bar 130 represents. A user can control which portions of the EPG display are magnified by pressing button 196 and moving cursor 152 to a portion of the display that the viewer wants magnified.

EPG Embodiment Displaying 3D Images

In one embodiment, the graphics circuitry that provides the information displayed on screen 102 stores the image elements in a 3D model and generates the image using a 3D accelerator. This is done in a manner similar to that described in our U.S. patent application Ser. Nos. 09/344,442 and 09/361,470. (The '442 and '470 applications describe 3D accelerator technology and are incorporated herein by reference.) Briefly, this is accomplished by a) storing a computer model of a geometric surface of one or more pictograms in a first set of memory locations within the television STB; b) storing within a second set of memory locations a two dimensional image to be mapped onto that surface (e.g. a pixel array); and c) constructing a pixel array comprising image 121. For example, image 121 is typically generated in the following manner.

Figure 4:
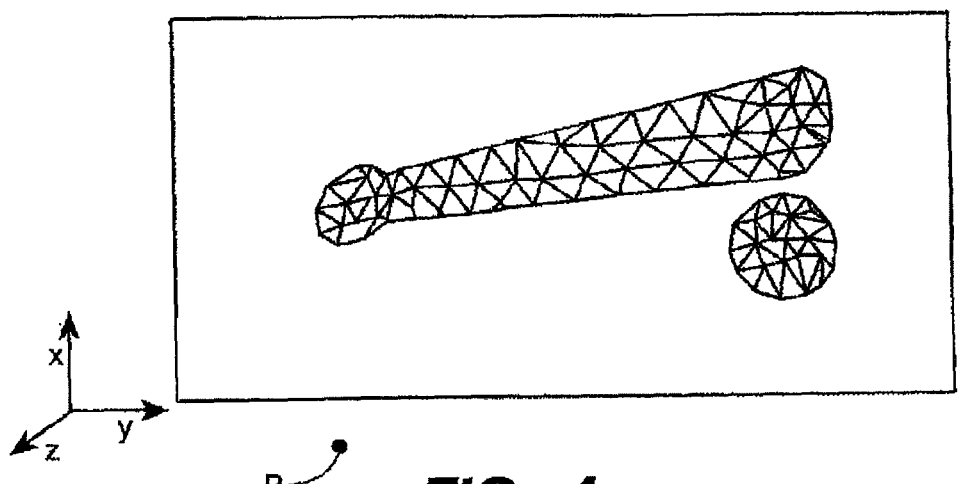
FIG. 4 illustrates a set of polygons depicting the surface of a pictogram object to be displayed on a television screen as one of the symbols that constitute part of the EPG.

A computer model describing the object depicted by image 120 is received from a source such as the broadcaster or some other source and stored in one or more memory devices within the STB. The computer model is typically in terms of a) a set of geometric surfaces; and b) pixel data that is to be applied, or "bound" to those surfaces. The geometric surfaces can be defined in terms of a set of polygons, e.g. triangles. Each polygon is defined in terms of the x, y, z coordinates of its vertices. Alternatively, these surfaces can be defined in terms of a mathematical formula (I.e. "implicitly defined"). FIG. 4 schematically illustrates the polygons used to model the shape of the object depicted by image to 121. FIG. 4 has the appearance of a wire frame model of polygons that show the shape of the surface and three-dimensional features (if any) of the object depicted by image 121. This wire frame model is not shown on screen 102, per se. Rather, FIG. 4 is merely provided to schematically indicate what kind of information is contained in the memory file that describes the geometric surfaces. Further information concerning the process of constructing a mesh of polygons is described in standard graphics libraries, such as Real 3D, published by Real 3D, a Lockheed Martin Corporation in 1996, and Direct 3D, published by. New Riders Publishing in 1997, each of which is incorporated herein by reference. The pixel data (contained in another memory file) includes information corresponding to colors and patterns to be applied to the polygons of FIG. 4. In the case of image 121, this would include a pixel array illustrating the appearance of wood, i.e. the wood finish of a baseball bat, the appearance of the baseball, and the letters "MLB".

The pixel array data is then "bound" to the mesh of polygons. This is accomplished by mapping polygon vertices to a location in the pixel array. This portion of the process is roughly analogous to an upholsterer choosing a piece of fabric, and binding it with a few nails to the corner of a couch being upholstered. The upholsterer subsequently asks his apprentice to finishing attaching the fabric to the couch. In this case, the 3D graphics accelerator finishes the task instead of an apprentice.

Thereafter, information is communicated to the 3D graphics accelerator within the STB identifying the location of a "virtual viewer." In other words, information is communicated to a 3D graphics accelerator identifying a point of reference P (FIG. 4) from which the object of image 121 is to be observed. Usually, point of reference P is a "default" position, and is simply some distance in front of the baseball bat. However, as explained below, a user can change the position P of this virtual viewer, e.g. with remote control device 150.

Information concerning a virtual lighting source is also communicated to the 3D graphics accelerator. This information can include a) the color of the light being provided by the lighting source; b) the brightness of this virtual lighting source; and c) whether the lighting source is diffuse or specular.

Thereafter, the 3D graphics accelerator within the STB generates image 121 (typically in the form of a pixel array) of the baseball bat as that baseball bat would be perceived by a virtual viewer if the virtual viewer were located at point P and the baseball bat were illuminated with the selected lighting source. The other pictograms, text blocks and images shown in FIG. 2 can be similarly generated. (As explained below, video programs and video clips can be bound to geometric surfaces for display on screen 102 as part of the EPG in a similar manner.)

As mentioned above, more details concerning the basic process of generating 3D images are discussed in the above-incorporated '442 and '470 applications. Also see Foley et al., "Computer Graphics" published by Addison-Wesley in 1996, incorporated herein by reference.

The fact that the various pictograms are generated in the above-described manner has a special significance for an EPG in accordance with the invention. In particular, the EPG maintains the various pictograms and blocks of the display in the form of a 3D object model. Thus, a user can "zoom" toward or away from the various pictograms of the EPG to make it easier to see what programs are being displayed. This is accomplished by pressing appropriate control buttons on remote controller 150 and causing the 3D graphics accelerator to regenerate the EPG images from a different reference point, e.g. a reference point closer to the baseball and bat. Thus, image 121 of the baseball and bat will appear larger on screen 102.

Figure 5:
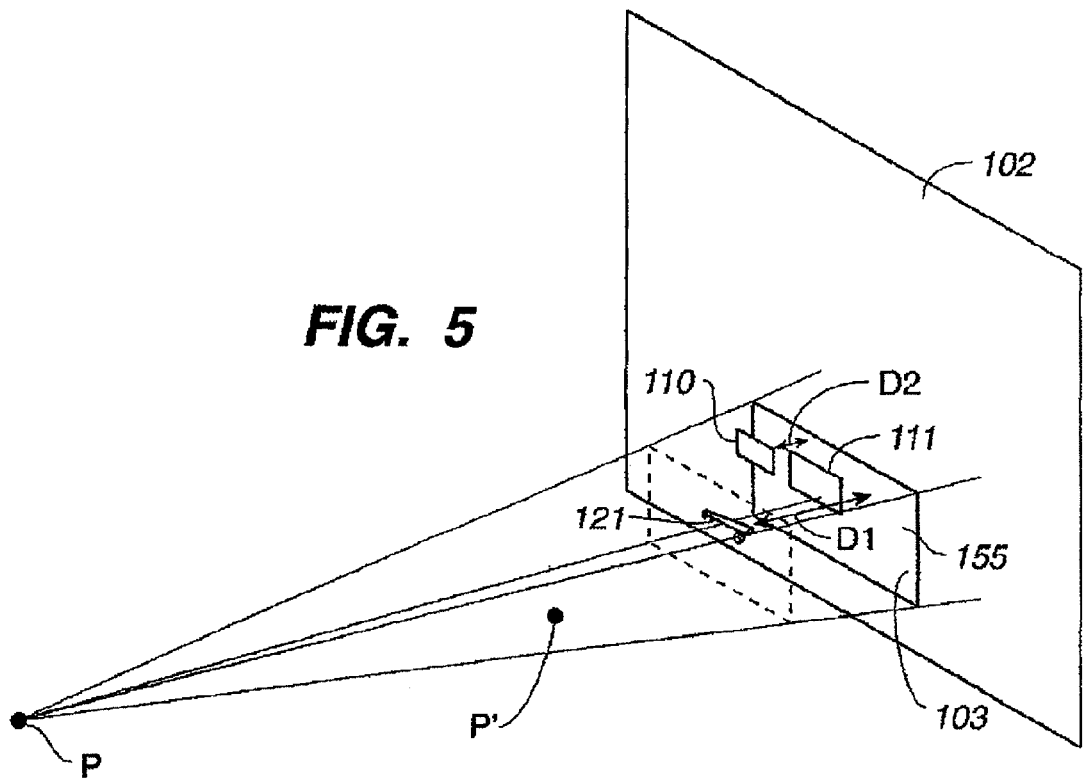
FIG. 5 schematically illustrates 3D aspects of the images displayed in the EPG.

The 3D aspects of the EPG are schematically shown in FIG. 5. Referring to FIG. 5, screen 102 is displaying a television program, but window 103 within screen 102 displays the EPG information. Since the EPG information is confined to window 103, it is somewhat shrunk. The image of the various icons and pictograms of the EPG are generated using a 3D graphics accelerator, and are displayed as if a virtual viewer were watching these icons and pictograms from a particular distance. A viewer can "zoom" toward the pictograms to get a closer view of them by adjusting an appropriate control element on remote controller 150 {e.g. a touch pad, mouse, joystick, track ball, etc.). In this way, the user can take a closer look at the pictograms.

Also, since the images of the pictogram objects are generated from a computer model such that each object is at different virtual location in space, a viewer may "fly" his virtual camera position close up to an object, and thus be able to see more details.

As can be seen in FIG. 5, image 121 is roughly a virtual distance D1 from the planar background portion 155 of the EPG. Text blocks 110 and 111 are a virtual distance D2 from planar background portion 155 of the EPG, whereas baseball 121a and bat 121 are a virtual distance D2 from planar background portion 155. By manipulating the position of the virtual viewer, located at point P, the virtual viewer can "fly" or "zoom in" on the various portions of the EPG, e.g. by moving the location of the virtual viewer to a point P'. (Of course, the actual viewer doesn't need to move. Rather, the graphics accelerator within television system 100 reconstructs the EPG image on screen 102 as that image would be seen by a virtual observer moving from point P to P'.)

Figure 5A:
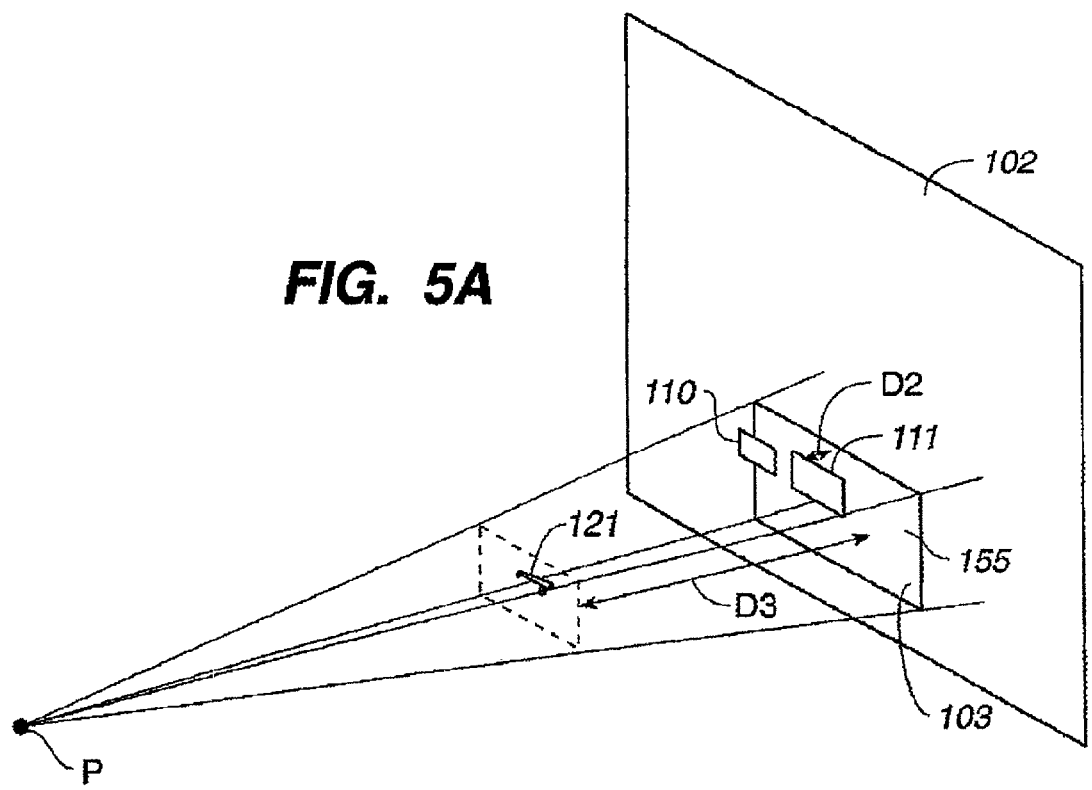
FIG. 5A illustrates an EPG in which the location of a virtual object within the EPG has moved to a location closer to a virtual viewer.

In one embodiment, in lieu of, or in addition to moving the position of virtual viewer P, one can also move the location of the objects displayed in the EPG. For example, in one embodiment, a user can click on object 121 (the baseball bat). The EPG can respond by reconstructing the image of the baseball bat on a geometric surface located a distance D3 from plane 155 (FIG. 5A). This creates the visual impression of having the baseball bat 121 move closer to the television viewer so he has a better view of what he has just clicked on and selected. The viewer can then confirm his selection by clicking, once again, on baseball bat 121.

Just as the location of pictograms can be changed by clicking on them, the location in virtual 3D space of text blocks can also be changed in the same manner. (As mentioned above, the text blocks are can be mapped onto geometric surfaces in the same manner as the various pictograms.)

Referring back to FIG. 4, in one embodiment, the polygon mesh in the shape of the baseball and bat can be a two-dimensional polygon mesh. In other words, all of the polygon vertices are coplanar (i.e. the polygon mesh is flat) and all of the vertices have the same z dimension. The mesh has the outline of a baseball and bat when viewed from a direction perpendicular to the plane of the mesh. (When the vertices have the same z dimension, all of the vertices are the same distance from a virtual plane 155. Virtual plane 155 is the plane of the EPG background.) Arranging the polygon vertices so that they are all coplanar has the advantage that any text mapped onto the polygons using the 3D accelerator (e.g. the letters "MLB" in FIG. 2) is easily read. However, in another embodiment, the polygons are not all coplanar, and in fact, can actually be 3 dimensional model of a baseball and bat. On other words, the polygons are not flat in this other embodiment. The polygons collectively form the shape of a baseball and bat in three dimensions. (The ball is spherical and the bat is roughly cylindrical.) In this embodiment, the polygon vertices have different z values.

Help Mode

An EPG in accordance with one embodiment of the invention can include several features that enhance user friendliness. For example, in one embodiment, the EPG provides an indication of which buttons on the remote controller can be actuated in a given situation. In another embodiment, the remote controller contains a light emitting diode (LED) or other indicator, and if a user presses an inappropriate button on the remote controller, the LED illuminates, thereby informing the user that he or she is doing something improper (In this embodiment, the CPU within video system 100 typically sends a signal to remote controller 150. Alternatively, in this embodiment, a microprocessor within the controller itself determines when an inappropriate button is being pressed.)

In yet another embodiment, the various control buttons of the remote controller contain or are associated with LEDs or other indicators (e.g. liquid crystal displays (LCDs) in conjunction with a touch screen etc.). The LEDs corresponding to those buttons that can be pressed in a given situation illuminate, thereby informing the viewer which buttons he or she can press in a given situation.

In yet another embodiment, the EPG may include a window on screen 102 (not shown) that indicates to the user which buttons would be appropriate to actuate in a certain situation.

In yet another embodiment, the EPG displays user assistance information on screen 102 if the user tries to actuate an inappropriate button on remote controller 150.

Figure 2B:
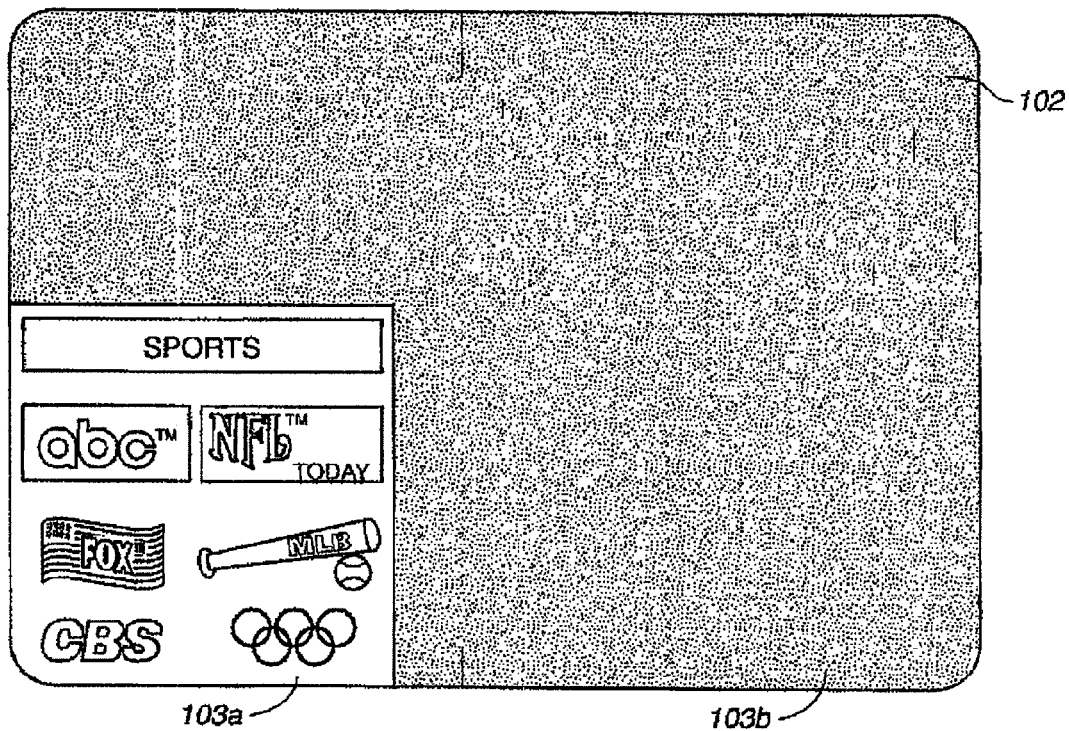
FIG. 2B illustrates an EPG displayed in a window region within a television screen.
Figure 2C:
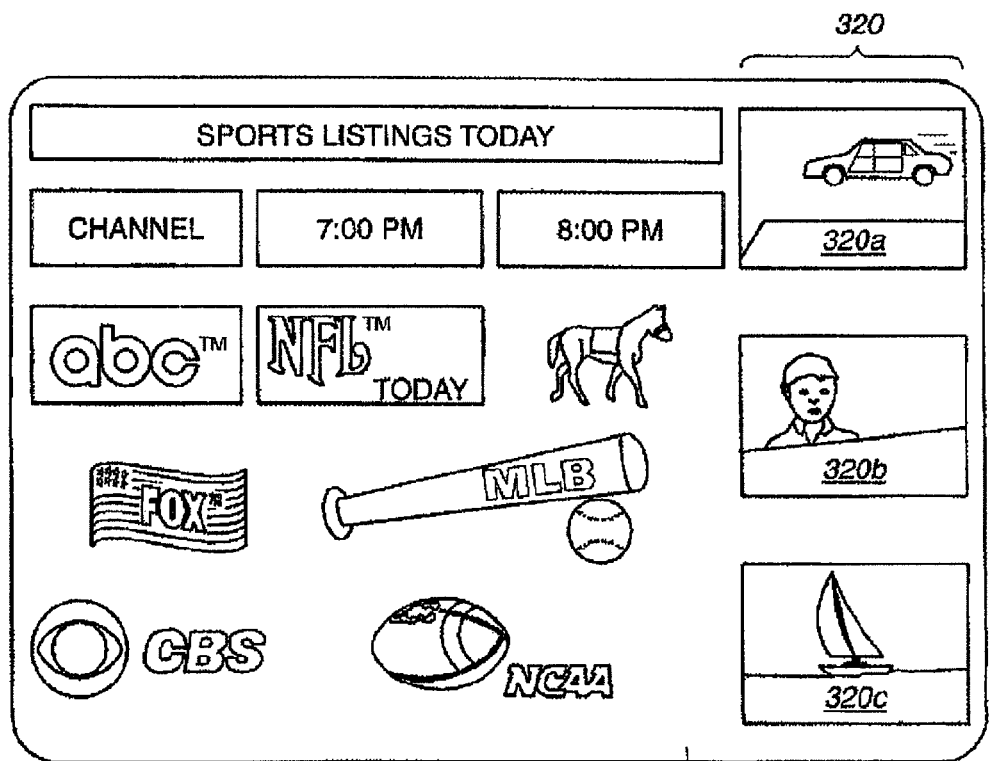
FIG. 2C illustrates an EPG display comprising a region for showing thumbnail displays of different programs.
Figure 2C:
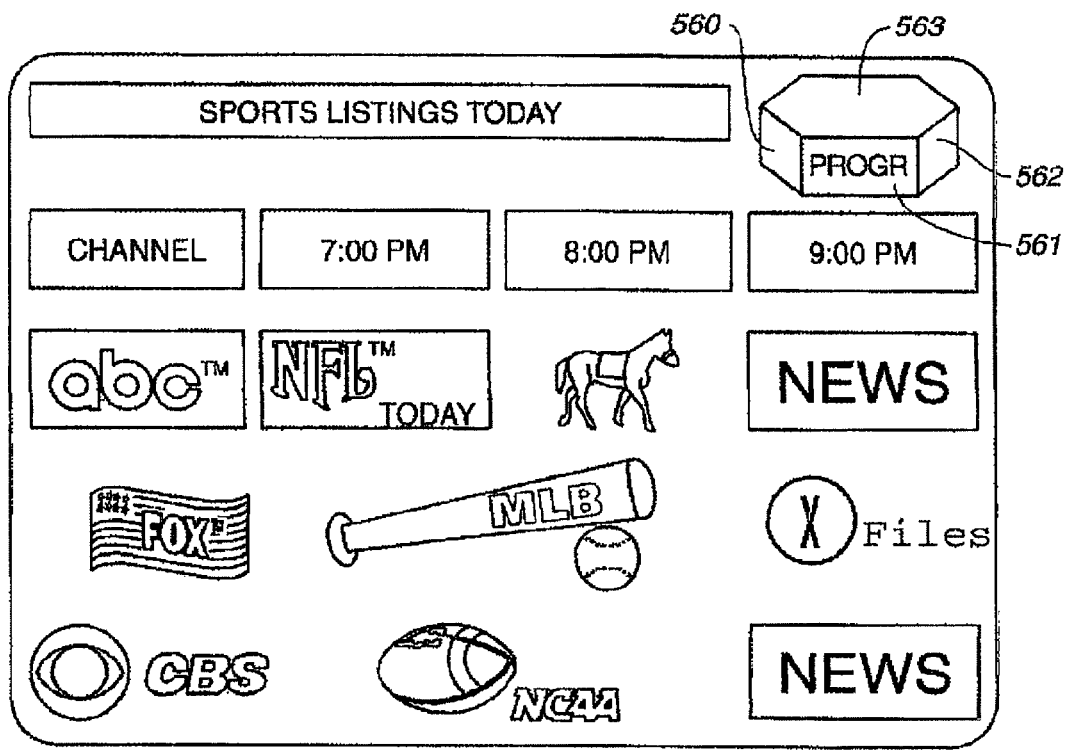
Figure 2D:
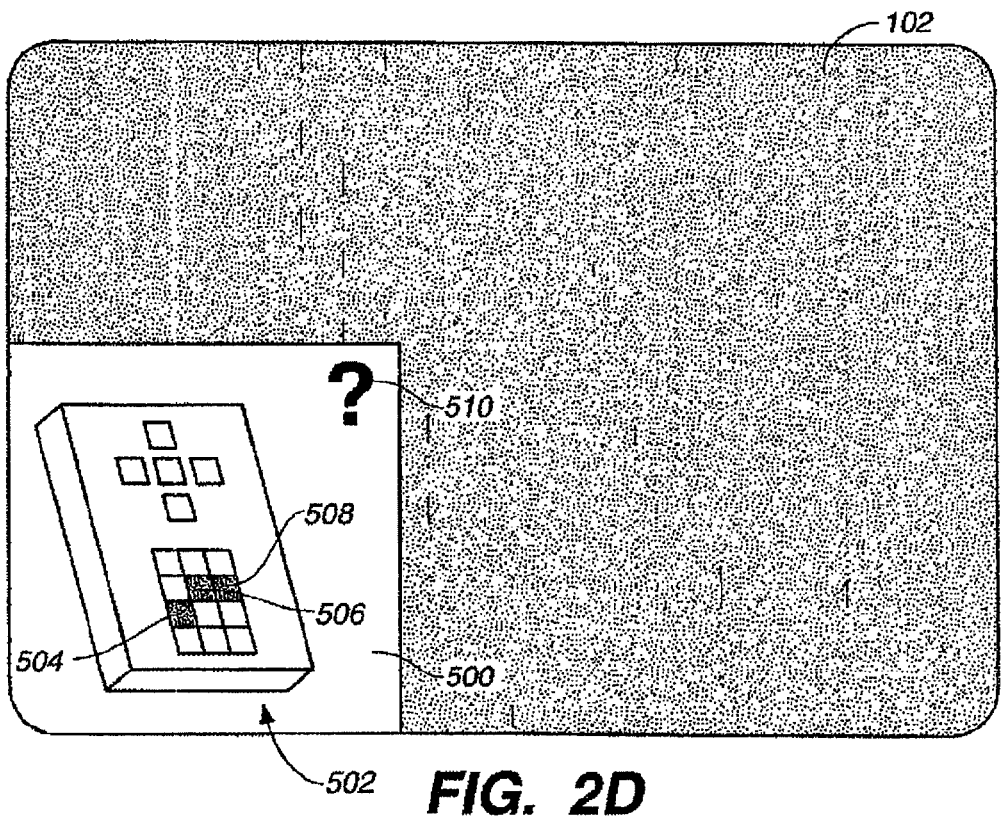
FIG. 2D illustrates an EPG displaying a window indicating which remote controller keys can be pushed.

In yet another embodiment, the remote controller contains a "help" key. If the user presses the help key, screen 102 provides a window 500 showing an image 502 of remote controller 150, and indicating which keys can be pressed in a given situation (FIG. 2D). (The keys that can be pushed, e.g. keys 504, 506 and 508) are highlighted.

By indicating to the user which keys can be pressed in a given situation, user friendliness of an EPG in accordance with the invention is enhanced.

In one embodiment, the EPG provides automated assistance to a user. This can be provided in several ways. For example, as mentioned above, the EPG can indicate to the user which remote control keys can be used in a situation. Additional information on their respective functions may also be provided. In another embodiment, the EPG includes a question mark icon 510 (FIGS. 2A and 2D). The user can click on this icon, to obtain help information. Alternatively, the user can click on question mark icon 510 and drag it to a pictogram on screen 102 to obtain information about what that pictogram does.

In one embodiment, one of the buttons on remote controller 150 is a "help" button that causes the EPG to depict on screen 102 a help menu. The EPG may suggest various "help" options by highlighting appropriate options to better guide the user.

Description of the Hardware within the STB

Figure 6:
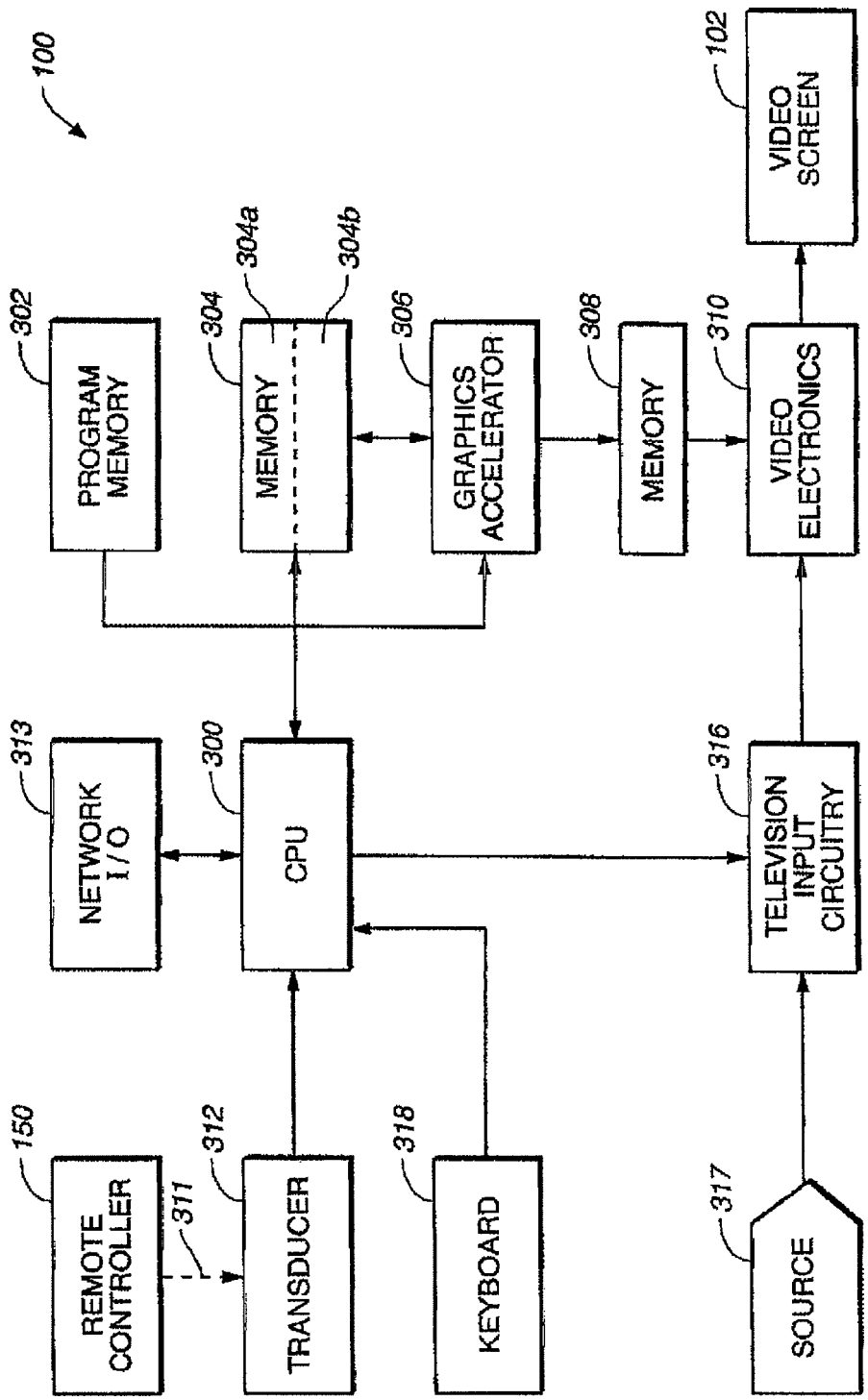
FIG. 6 is a block diagram of a television system in accordance with the present invention.

Referring to FIG. 6, the hardware used by the receiver to practice the invention typically comprises a) a CPU 300 (e.g. a Celeron or Pentium, manufactured by Intel Corporation, or any other equivalent CPU) coupled to a) a program memory 302 (typically a ROM, EPROM, EEPROM, EAROM, hard disk, CD ROM, or other memory device); b) a second memory device 304 (e.g. a RAM or magnetic disk); and c) a graphics accelerator circuit 306. Program memory 302 contains the program instructions executed by CPU 300. Memory 304 can comprise one or more memory devices. In one embodiment, memory 304 contains a) a portion 304a containing information concerning the polygons used to construct images of objects; and b) a portion 304b containing pixel information to be applied, or bound, to the polygons. Graphics accelerator 306 accesses the information contained in memory 304 and constructs an image in a pixel array memory 308. Information from pixel array memory 308 is provided to video electronics circuit 310 for display on video display screen 102.

Also shown in FIG. 6 is remote control device 150, which is manipulated by a user as described above. Remote control device 150 provides signals (typically communicated via infra red communication (or any other method as previously described) shown as dotted line arrow 311) to a transducer 312 that is coupled to CPU 300, CPU 300 reads the signals provided by remote control device 150, and controls the images displayed on video screen 102 in response thereto. Also, many small differences can be made in the "architecture" of connecting the remote control base unit (e.g. the transceiver that receives signals from remote controller 150). In some cases this architecture may mimic a parallel or serial port, and in other cases it may mimic a mouse and or a keyboard. This is advantageous, since it allows remote controller 150 to send commands directly to system 100, without requiring special driver software.

Also shown in FIG. 6 is a network I/O circuit 313. Network I/O circuit 313 can be any of numerous different types of circuits, e.g. a modem for communicating with the internet, or an interface circuit for communicating with other LAN or WAN networks. As mentioned above, by clicking on icon or pictogram 122, a user can obtain data concerning items that can be purchased from different vendors. In one embodiment, when a user clicks on one of these icons, a signal is communicated to a server coupled to the LAN or WAN network, and that server communicates via network circuit 313 back to CPU 300 information to be displayed on screen 102 concerning merchandise that can be ordered from that vendor. This information can be in the form of a web page, for example. Network circuit 313 can also be used to order pay-per-view items via a LAN or WAN.

Also shown in FIG. 6 is a television input circuit 316. Circuit 316 receives a video signal from a source 317, e.g. a television antenna, an electrical or optical cable system, a satellite system, or any other appropriate video signal source. This signal is communicated to video electronics 310 for display on screen 102.

In one embodiment, the EPG can receive information and commands by a keyboard 318 that is electrically coupled to CPU 300. Keyboard 318 can be an alphanumeric keyboard, e.g. a QWERTY keyboard. However, other types of keyboards can be used in conjunction with the EPG. Keyboard 31.8 provides additional flexibility for a user controlling the EPG.

Other Programmable Options

In one embodiment, the EPG can be programmed to provide to the user a reminder when certain programs of interest are going to be on. This can be accomplished using remote controller 150, clicking on a selected program pictogram, and pressing a control button on the remote controller that instructs CPU 300 to display a prompt on screen 102 shortly before that program is to be broadcast. Alternatively, remote controller 150 can have a numeric keyboard or a more complicated input control console for purposes of entering such information into the EPG. Alternatively, keyboard 318 can be used to enter this information.

In one embodiment, a user can modify the format in which the EPG information is to be displayed. For example, the user can adjust the size of the text (e.g. the font size) of the information displayed by the EPG. Thus, viewers with poor vision will be better able to read the information displayed by the EPG. Viewers with good vision can shrink the text size so that more information can be displayed on the screen by the EPG. This can be accomplished by using remote controller 150 to cause CPU 300 to display an appropriate menu of control options on screen 102. The user can then click on the displayed options to enter a text font size into the EPG. (The text font size is typically stored within a memory in the EPG, e.g. within memory 304.) Rather than clicking on text font size options, text font size information can be entered into the EPG using keyboard 318.

There are a number of ways one can enter mode information into the EPG. For example, remote controller 150 can have a mode button. When the mode button is pressed, a list of programmable menu options appears on screen 102, and the user can click on a desired option. Alternatively, the EPG can have a menu icon, and the user can click on the menu icon. Alternatively, there can be a menu button on video system 100 itself that a user can push. Other techniques can be used to communicate programmable option choices to the EPG.

EPG with Reduced Size Program Displays

In another embodiment, portions of the EPG can be used to display reduced size (for example, thumbnail) versions of programs appearing on various channels, thereby permitting a viewer to preview programs. For example, optionally, a portion 320 of screen 102 (FIG. 2C) can depict a thumbnail display of what is playing on one of the channels. In another embodiment, portion 320 of screen 102 can depict a set of reduced size displays (e.g. in portions 320a, 320b, and 320c of portion 320 of screen 102) so that a viewer can see what is showing on different channels. In an alternative embodiment, the reduced size displays can be mapped into geometric surfaces, e.g. of a polyhedron (e.g. a cube) as described in U.S. patent application Ser. No. 09/378,184, filed Aug. 20, 1999 by Kamen et al., and U.S. patent application Ser. No. 09/378, 220, filed Aug. 20, 1999 by Kamen et al., the '184 and '220 applications are incorporated herein by reference.

The '184 and '220 applications teach mapping (or binding) video images onto geometric surfaces using 3D accelerator technology. A 3D graphics accelerator generates a pixel array corresponding to these images as bound onto the geometric surfaces. By altering the position of a "virtual viewer", or by altering the shape or angle of the geometric surface, one can create an appearance similar to projecting a movie onto a surface having a particular shape, or held at a particular angle. The '184 and '220 applications teach, among other things, that one can display a polyhedron (e.g. a cube), with different video images appearing on the various faces of the cube. One can alter the orientation of the polyhedron using the remote controller so that different polyhedron faces are exposed. In one embodiment of the invention, programs from different channels are mapped onto different faces of a polyhedron (e.g. faces 560, 561 and 562 of an octahedron. 563 in FIG. 2C'). A viewer can rotate octahedron 563 to obtain a thumbnail display of what is playing on the various channels. (For such ad embodiment, it is typically desirable to include a video capture card within system 100 for downloading the video signals into a pixel memory so that graphics accelerator 306 can map these pixels onto the various geometric surfaces of polyhedron 563.)

The location and angle of the geometric surface upon which video clips are mapped can be modified by the EPG. For example, by clicking on a reduced size video image, the user can cause the EPG to move the image closer to the virtual viewer (i.e. enlarge the portion of the screen showing the video image.)

EPG Operating as Shell or Window for Other Applications

In one embodiment, the EPG system provides a reliable and efficient method of updating or replacing the application software that implements the electronic guide at the user sites. This can be accomplished by downloading such software either from the cable broadcaster (e.g. from source 317 using input circuitry 316), or via a WAN or LAN, e.g. using network I/O circuit 313 (FIG. 6). The EPG software can be designed in modules. For example, one module is optionally a graphics user interface (GUI) module, whereas another module can handle the different display icons. Another module can handle 3D graphics generation, and another module can be a master program module. These modules can be downloaded into program memory 302. EPG updates can be provided either automatically or in response to a prompt from the user using remote controller 150.

In an embodiment which permits the automated updating of software, the program memory 302 should contain a programmable segment (e.g. a RAM, EEPROM, EAROM, magnetic memory or magneto-optic memory) to accommodate the loading of data.

In one embodiment, the EPG operates as a shell or window to enable a user to access other applications or information systems that are not part of the EPG application or data. For example, in one embodiment, when using the EPG, one can press a button on the remote controller, or click on an icon within the EPG to active Internet server software (e.g. Netscape software Internet Explorer software, or other web surfing software package). (Such software can be stored within program memory 302.) In this embodiment, the information provided by the web and the web surfing software package is bound to a flat geometric surface and displayed on screen 102. The viewer can then use the screen to browse the Internet as if he or she were logged onto a PC. (In such an embodiment, it is typically desirable to couple alphanumeric keyboard 318 or other alphanumeric input device to video system 100 so that the user can enter key words for searching or type URLs into system 100. In this embodiment, system 100 communicates with a proxy server or other ISP via network I/O circuit 313 (FIG. 6).

The options and features described above can be combined to provide a 3D enhanced EPG that allows user friendliness and interactivity not known in current EPG systems. However, these options and features can be practiced independently. Further, different combinations of these options and features can be practiced in an EPG.

While the invention has been described with respect to specific embodiments, those skilled in the art will appreciate that changes can be made in form and detail without departing from the spirit and scope of the invention. For example, an EPG in accordance with the present invention can be displayed on CRT, LCD, projection, or other types of display systems. The EPG can be displayed on a television, personal computer, or a device that is a combination television/personal computer. The EPG can be used in conjunction with video signals that are provided by electrical or optical cable, radio wave broadcast, satellite broadcast, or other types of video signal transmission. The information displayed in the EPG can originate from any of numerous sources, e.g. provided via electrical or optical cable, radio waves, satellite broadcast, or a wide area network (for example, the Internet).

When displaying video information, the video information can be applied to a geometric surface using a 3D graphics pipeline. Thus, as shown in FIG. 2B, both the EPG in portion 103a of screen 102 and the television program in portion 103b can be bound to geometric surfaces and displayed using a 3D graphics pipeline. (In fact, in one embodiment, when watching the television program without the EPG, the television program can be bound to a geometric surface and displayed as described above.) As explained in the above-incorporated '442 application, the 3D graphics pipeline can be implemented by a combination of hardware elements, known as accelerators, and software, some of which is referred to as drivers. The partitioning between hardware and software may vary. Accordingly, all of these modifications come within the present invention.

The invention claimed is:

1. An apparatus comprising:
    a processor; and
    a memory, the memory including machine-executable instructions that when provided to the processor, cause the apparatus to:
    display a programming guide indicating a plurality of broadcast programs being provided on a plurality of channels;
    select a plurality of display elements for display in the programming guide, each selected display element corresponding to a broadcast program, wherein each display element of the plurality of display elements representing broadcast programs includes a combination of text block display elements, pictogram display elements and video clip display elements;
    generate a 3D image by mapping a first video clip of the plurality of video clip display elements to a surface of a 3D shape, wherein the 3D shape is related to a category of the broadcast program corresponding to the first video clip, and wherein the first video clip comprises a video program, a commercial, or a preview clip;
    receive rating information associated with one or more of the broadcast programs, the rating information being received from a rating service to which a viewer of the broadcast program subscribes;
    scale a size of each of the plurality of display elements based on the received rating of the corresponding broadcast program, scaling the size of each of the plurality of display elements including scaling, in an x direction and a y direction, a size of at least a pictogram element of the display element; and
    display the plurality of display elements on the programming guide in accordance with the scaled sizes of each of the display elements.

2. The apparatus of claim 1, wherein the memory includes further machine-executable instructions to cause the apparatus to:
    utilize a 3D graphics pipeline to generate the 3D image.

3. The apparatus of claim 1, wherein the memory includes further machine-executable instructions to cause the apparatus to:
    display the 3D image in a window region within the programming guide.

4. The apparatus of claim 1, wherein the memory includes further machine-executable instructions to cause the apparatus to:
    alter one of the plurality of display elements displayed in the programming guide in response to a signal received from a remote controller.

5. The apparatus of claim 1, wherein the memory includes further machine-executable instructions to cause the apparatus to:
    receive visual information from an internet, and applying the visual information as a texture to a surface of the 3D shape.

6. The apparatus of claim 1, the memory including further machine-executable instructions that when provided to the processor, cause the apparatus to:
    determine a color scheme for each of the plurality of display elements, based on a show category of the corresponding broadcast program; and
    display each of the plurality of display elements in accordance with the determined color scheme.

7. The apparatus of claim 1, wherein the memory includes further machine-executable instructions to cause the apparatus to:
    receive a signal from a remote controller corresponding to an instruction to magnify a first portion of the programming guide screen;
    identify one or more of the plurality of display elements in the first portion of the programming guide screen;
    rescale the one or more identified display elements in accordance with the instruction to magnify the first portion of the programming guide screen; and
    update the programming guide screen to display the one or more identified display elements in accordance with the rescaled sizes.

8. The apparatus of claim 7, wherein receiving the signal to magnify a first portion of the programming guide screen comprises:
    receiving input controlling a position of a cursor displayed on the programming guide screen; and
    receiving an instruction to magnify a portion of programming guide screen based on the position of the cursor.

9. The apparatus of claim 1, wherein the scaling further includes scaling the size of each of the plurality of display elements based on a comparison of a user's viewing tastes to content of the corresponding broadcast program.

10. The apparatus of claim 1, wherein the programming guide is not displayed in a time slot and channel grid format.

11. A method comprising:
    receiving information regarding a plurality of broadcast programs being provided on a plurality of channels;
    selecting a plurality of display elements for display in a programming guide screen, each selected display element corresponding to a broadcast program, wherein each display element of the plurality of display elements representing broadcast programs includes a combination of text block display elements, pictogram display elements, and video clip display elements;
    generating a 3D image by mapping a first video clip of the plurality of video clip display elements to a surface of a 3D shape, wherein the 3D shape is related to a category of the broadcast program corresponding to the first video clip, and wherein the first video clip comprises a video program, a commercial, or a preview clip;
    receiving rating information associated with one or more of the broadcast programs, the rating information being received from a rating service to which a viewer of the broadcast program subscribes;
    scaling a size of each of the plurality of display elements based on the received rating information associated with the corresponding broadcast program, scaling the size of each of the plurality of display elements including scaling, in an x direction and a y direction, a size of at least a pictogram element of the display element; and displaying the plurality of display elements on the programming guide screen in accordance with the scaled sizes of each of the display elements.

12. The method of claim 11, further including:
storing the first video clip in memory.

13. The method of claim 11, further including utilizing a 3D graphics pipeline to generate the 3D image.

14. The method of claim 11, further including altering one of the plurality of display elements displayed in the programming guide screen in response to a signal received from a remote controller.

15. The method of claim 11, further comprising:
receiving a signal from a remote controller corresponding to an instruction to magnify a first portion of the programming guide screen;

identifying one or more of the plurality of display elements in the first portion of the programming guide screen;

rescaling the one or more identified display elements in accordance with the instruction to magnify the first portion of the programming guide screen; and updating the programming guide screen to display the one or more identified display elements in accordance with the rescaled sizes.

16. The method of claim 15, wherein receiving the signal to magnify a first portion of the programming guide screen comprises:

receiving input controlling a position of a cursor displayed on the programming guide screen; and receiving an instruction to magnify a portion of programming guide screen based on the position of the cursor.

* * * * *